United States Patent
Franzelin et al.

(10) Patent No.: US 12,373,331 B2
(45) Date of Patent: Jul. 29, 2025

(54) METHOD FOR TESTING A DATA PROCESSING DISTRIBUTED TO MULTIPLE PROGRAMS

(71) Applicant: Robert Bosch GmbH, Stuttgart (DE)

(72) Inventors: Fabian Franzelin, Tuebingen (DE); Jochen Kokemueller, Ostfildern (DE)

(73) Assignee: ROBERT BOSCH GMBH, Stuttgart (DE)

( * ) Notice: Subject to any disclaimer, the term of this patent is extended or adjusted under 35 U.S.C. 154(b) by 221 days.

(21) Appl. No.: 18/182,493

(22) Filed: Mar. 13, 2023

(65) Prior Publication Data
US 2023/0315616 A1    Oct. 5, 2023

(30) Foreign Application Priority Data
Mar. 31, 2022  (DE) ...................... 10 2022 203 166.0

(51) Int. Cl.
*G06F 11/36* (2025.01)
*G06F 11/3668* (2025.01)

(52) U.S. Cl.
CPC ...... *G06F 11/3688* (2013.01); *G06F 11/3692* (2013.01)

(58) Field of Classification Search
CPC ............ G06F 11/3688; G06F 11/3692; G06F 11/3696
See application file for complete search history.

(56) References Cited

U.S. PATENT DOCUMENTS

| | | | |
|---|---|---|---|
| 11,072,356 B2 * | 7/2021 | Mong | H04L 67/12 |
| 2004/0153793 A1 * | 8/2004 | Jarboe, Jr. | G11C 29/08 |
| | | | 714/27 |
| 2020/0226225 A1 * | 7/2020 | Zaytsev | G01M 17/00 |
| 2023/0161690 A1 * | 5/2023 | Shetty | G06F 11/3457 |
| | | | 717/124 |

* cited by examiner

*Primary Examiner* — Hanh Thi-Minh Bui
(74) *Attorney, Agent, or Firm* — NORTON ROSE FULBRIGHT US LLP

(57) ABSTRACT

A method for testing a data processing distributed to multiple programs. The method includes executing an event simulator which, according to a predefined test scenario for testing multiple programs, generates test events for each program, and a replay unit, which is connected to the event simulator, and for each program starts a data processing by the program during a start-test event for the program, receives output data generated by the program and forwards them to one or to multiple of the other programs during an output-data-visibility event, and ends the data processing by the program during an ending-test event for the program.

7 Claims, 5 Drawing Sheets

METHOD FOR TESTING A DATA PROCESSING DISTRIBUTED TO MULTIPLE PROGRAMS

CROSS REFERENCE

The present application claims the benefit under 35 U.S.C. § 119 of German Patent Application No. DE 10 2022 203 166.0 filed Mar. 31, 2022, which is expressly incorporated herein by reference in its entirety.

FIELD

The present description relates to a method for testing a data processing distributed to multiple programs.

BACKGROUND INFORMATION

Software-in-the-Loop and Hardware-in-the-Loop are frequent approaches for testing software, in particular, control software in the field of autonomous driving. In Hardware-in-the-Loop testing the software to be tested runs on a real embedded system. Software-in-the-Loop tests offer the advantage of flexibility, since no expensive hardware equipment is required and they may be used for testing asynchronously executed programs as well as for troubleshooting and for unity and integrations tests. In the process, however, the simulation time may differ completely from that which is achieved by a real-time system. For example, the simulation may last longer by several orders of magnitude or may also be faster than when it is executed on hardware. For an efficient testing, however, recalculations must be reproducible which, in turn, requires a reproducible global simulation time frame.

Accordingly, methods are desirable, which enable the testing of a data processing, which is distributed to multiple programs executed in parallel, using a reproducible global simulation time frame.

SUMMARY

According to different specific embodiments of the present invention, a method is provided for testing a data processing distributed to multiple programs, which includes the following: executing an event simulator which, according to a predefined test scenario for testing multiple programs, generates test events for each program, which include at least
  a start-test event, which indicates that the program is to start a data processing;
  an ending-test event, which indicates that the program is to end the data processing;
  an output-data-visibility event, which indicates that the output data of the program are visible to one or to multiple of the other programs; and
  an input-data-visibility event, which indicates that the test input data for the program are to be fed to the program;
executing a replay unit, which is connected to the event simulator, and for each program
  starts the data processing by the program during the start-test event for the program;
  receives output data generated by the program and forwards them during the output-data-visibility event for the program to the one or to multiple of the other programs; and
  ends the data processing by the program during the ending-test event for the program;
recording results of the execution of the programs and analyzing the results with respect to errors of the data processing.

The above-described method enables the testing of programs, whose execution and communication of data among one another takes place according to a time frame provided by a test scenario. The test scenario is thus also reproducible for, in principle, asynchronously executed programs.

The start-test event and the ending-test event may indicate that the respective program is to be activated or deactivated (and accordingly starts or ends its data processing). The program may, however, run in the background until it is activated again.

Various exemplary embodiments are specified below.

Exemplary embodiment 1 is a method for testing a data processing distributed to multiple programs as described above.

Exemplary embodiment 2 is a method according to exemplary embodiment 1, where the event simulator ascertains an order of the test events generated for the programs in order to implement the predefined test scenario, and outputs the test events to the replay unit according to the ascertained order.

Thus, it is possible with the aid of a suitable definition of the test scenario to establish the order of the events and thus the context of the execution of the individual programs.

Exemplary embodiment 3 is a method according to exemplary embodiment 1 or 2, where the data processing is a control of a robotic device and each program of the multiple programs is a program for a respective embedded data processing unit of the robotic device.

The method thus enables, in particular, a testing of the control software for a robotic device, which is executed with the aid of distributed hardware (for example, of multiple ECUs (Electronic Control Units) of a vehicle).

Exemplary embodiment 4 is a method according to exemplary embodiment 3, where the event simulator and/or the replay unit is/are executed on a data processing device external to the robotic device.

The method thus enables the testing of the control (i.e., of the control software) of the robotic device outside the robotic device. For example, control software may be reliably tested during the development process without loading the software onto the robotic device.

Exemplary embodiment 5 is a method according to one of exemplary embodiments 1 through 4, where for each program, the output data include at least one output data element including a respective time stamp, the replay unit ascertains whether it has already forwarded an output data element that has been generated by one of the multiple programs and that has a higher time stamp, and carries out an error handling if it has already forwarded an output data element that has been generated by one of the multiple programs and that has a higher time stamp.

For example, the replay unit may abort the test and/or inform a user. In this way, it is ensured that when testing, a sequence takes place according to a monotonically increasing time frame.

Exemplary embodiment 6 is a data processing system, which is configured to carry out a method according to one of exemplary embodiments 1 through 5.

Exemplary embodiment 7 is a computer program including commands which, when they are executed by one or by multiple processors, prompt the one or multiple processors to carry out a method according to one of exemplary embodiments 1 through 5.

Exemplary embodiment 8 is a computer-readable medium, which stores commands which, when they are executed by one or by multiple processors, prompt the one or multiple processors to carry out a method according to one of exemplary embodiments 1 through 5.

In the figures, similar reference numerals relate in general to the same parts in all the various views. The figures are not necessarily true to scale, the emphasis instead being placed in general on the representation of the principles of the present invention. Different aspects are described in the following description with reference to the following drawings.

The following detailed description refers to the figures which, for the purpose of explanation, show specific details and aspects of this description in which the present invention may be carried out. Other aspects may be used and structural, logical and electrical changes may be carried out without departing from the scope of protection of the present invention. The different aspects of the present is description are not necessarily mutually exclusive, since some aspects of this description may be combined with one or with multiple other aspects of this description in order to form new aspects.

BRIEF DESCRIPTION OF THE DRAWINGS

Various example embodiments of the present invention are described in greater detail below.

DETAILED DESCRIPTION OF EXAMPLE EMBODIMENTS

Figure 1:
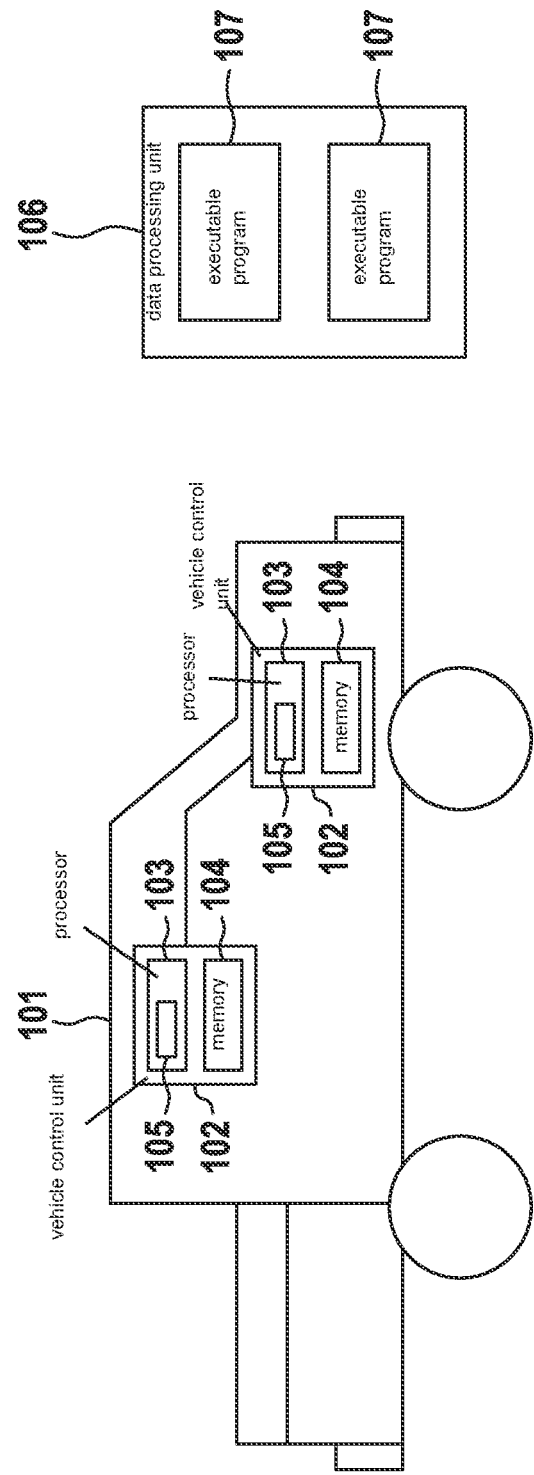
FIG. 1 shows a vehicle 101, according to an example embodiment of the present invention.

FIG. 1 shows a vehicle 101, according to an example embodiment of the present invention.

AOS (Automotive Operating System) and other AD (Automotive Driving) systems such as ROS (Robot Operating System) allow for asynchronously running distributed systems similar to an FBP (Flow Based Programming)-paradigm. For example, vehicle 101 includes multiple control units (for example, Electronic Control Units (ECUs)) 102, each of which carries out a processing and are connected to one another and exchange data.

Each vehicle control unit 102 includes data processing components, for example, a processor (for example, a CPU (central unit)) 103 and a memory 104 for storing a respective control program 105, according to which vehicle control unit 102 operates, and data, which are processed by processor 103.

For example, for each vehicle control unit, stored control program 105 (computer program) includes instructions which, when respective processor 103 carries them out, prompt vehicle control units 102 together to carry out driver assistance functions or even to autonomously control vehicle 101.

Before control software (here, including control programs 105) is used, it is necessary to test it, in particular, in safety-relevant applications such as in autonomous driving. On the one hand, the testing may be carried out without a sequence control on the vehicle target hardware (here, on control units 102), which may be used in a vehicle 101. On the other hand, it is also desirable, however, to be able to test control software outside the vehicle.

For this purpose, a data processing unit (for example, a test computer) 106 is provided, which executes for each control unit 103 a respective executable program 107, which corresponds to control program 105 executed by control unit 103.

The execution of executable program 107 occurs with the aid of an entity, whose sequence may be controlled, for example, a process, a thread or a program function.

Control programs 105 are executed typically asynchronously on control units 103 in the vehicle. In order to test these, input data are fed to them on predefined interfaces, the execution of control programs 105 is activated (and/or their sequence is controlled) and the outputs generated by the control programs are recorded (in order to later check them). This (feed of input data, activation/sequence control and recording) is referred to as recalculation (recompute).

These recalculations are important both during testing with the aid of the (embedded) system in vehicle 101 and also on external data processing unit 106. During the execution of corresponding programs 107, corresponding recalculations are carried out for testing. The design of the distributed system (in this example, made up of control units 103) in this case defines the system to be tested with the aid of the recalculations, which must be appropriately designed. In CI (Continuous Integration) pipelines, they are typically part of the test strategy for unit tests, integration tests and system tests.

Testing asynchronously executed programs 107 requires, however, a global simulation time. In general, no reproducible global simulation time frame exists for an arbitrary AOS system. The former is required, however in order to execute reproducible recalculations on a data processing unit (workstation, cloud, etc.) or also on the target system in order to be able to reproduce the system behavior, to understand errors, and to reliably correct program errors.

In order to make this possible, a global time frame is implemented according to various specific embodiments with the aid of event simulation, for example, on a fine granularity level. This includes the simulation of application data events or message transmission events and test events In other words, a mechanism is provided (and, for example, implemented by the data processing unit), which synchronizes the data flow and the sequence (i.e., the control flow) of asynchronously running programs 107 (which execute a respective algorithm) to a shared time frame. This time frame may be independent of the actual execution duration of programs 107.

Figure 2:
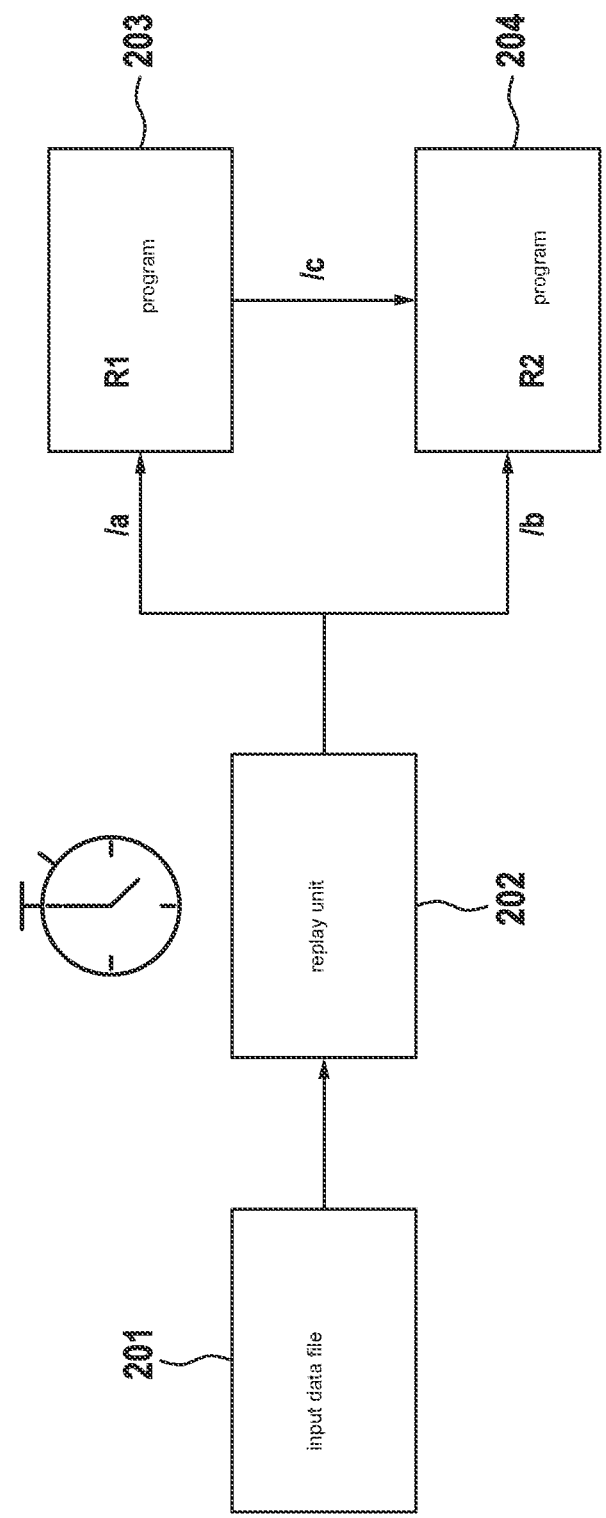
FIG. 2 illustrates a recalculation scenario including a data flow between two programs, according to an example embodiment of the present invention.

FIG. 2 illustrates a recalculation scenario including a data flow between two programs 203, 204. An input date file 201 is received by a replay unit 202. Replay unit 202 implements a "DoL player," "DoL" standing for Deterministic open Loop. Here, (as opposed to Software open Loop) the focus lies on reproducibility (i.e., determinism) of the execution. In contrast to Hardware-open-Loop, no embedded hardware is involved in the execution. Replay unit 202 delivers respective parts of the input data (identified with /a and /b) to programs 203, 204. In this example, first program 203 processes the data delivered to it by replay unit 202 and generates output data (identified with /c) for second program 204.

According to various specific embodiments, a global time frame is implemented for a recalculation (as shown, for example, in FIG. 2), according to which replay unit 202 outputs data to programs 203, 204 and also controls the forwarding of data (data /c in the above example) between programs 203, 204. Replay unit 202 may also start or end the execution of a program 203, 204 (or a data processing by the program) according to the global time frame.

The mechanism which synchronizes the data flow and the sequence (i.e., control flow) of programs 203, 204 to the shared (global) time frame may be viewed as a combination of a discrete event simulation with software lockstep, since (from an external perspective) the recalculation assumes the form of an event simulation and replay unit 202 may be viewed as a comparison unit of a software lockstep mechanism.

Figure 3:
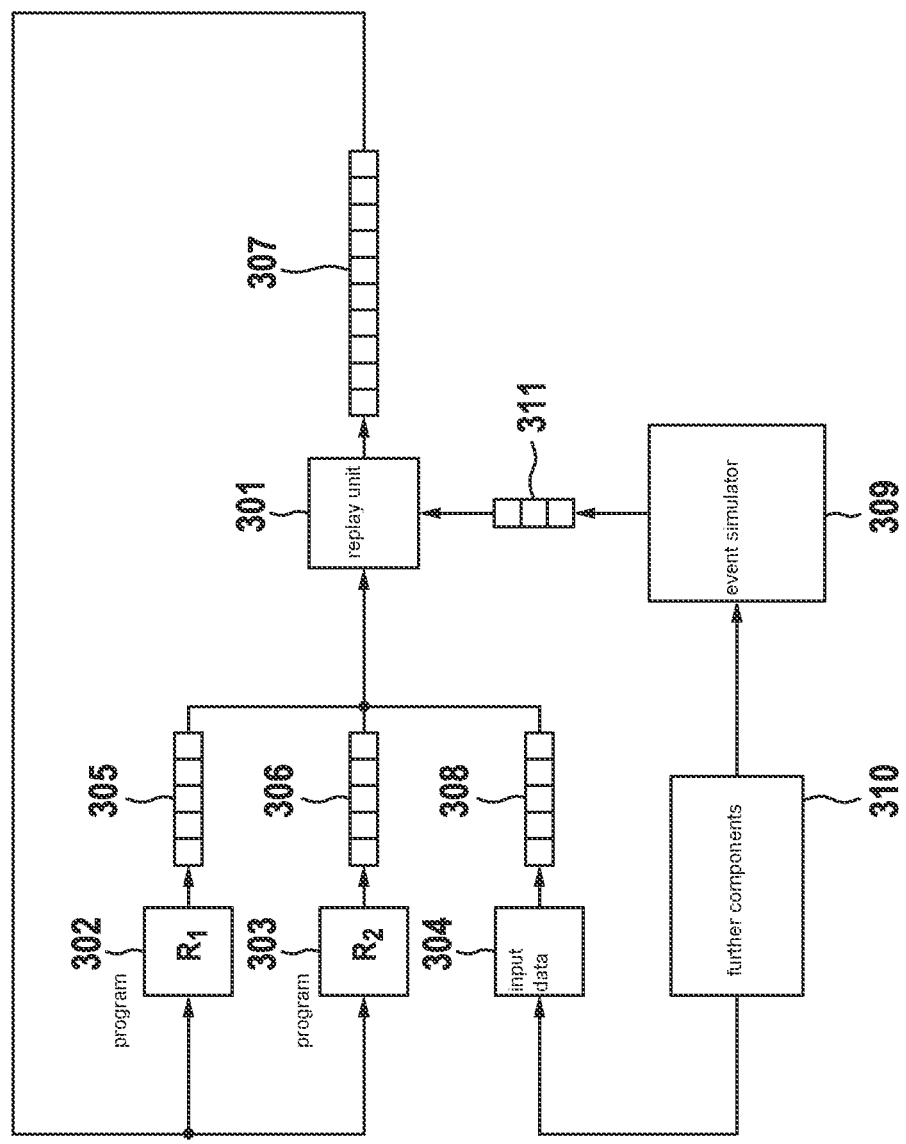
FIG. 3 shows an architecture for implementing a shared global simulation time frame, according to an example embodiment of the present invention.

FIG. 3 shows an architecture for implementing a shared global simulation time frame. It shows, in particular, the actual data flow, for example, for a recalculation as it is represented in FIG. 2. In this case, a replay unit 301 is connected between the outputs (i.e., output interfaces) and the inputs (i.e., input interfaces) of programs 302, 303 (which correspond, for example, to programs 203, 204). Replay unit 301 also receives input data 304, which it is able to deliver to programs 302, 303. Replay unit 301 is thus able to control at which times input data and data output by programs 302, 303 are delivered to programs 302, 303 and is able to start and end the data processing by programs 302, 303 (for example, by transmitting an activation signal or a termination signal to a program or to a process that manages the execution of the program).

As mentioned above, the replay unit has software lockstep character. In this context, each program 302, 303 may be viewed as a processing unit, which delivers outputs to a comparison unit. During software lockstep, the comparison unit compares outputs and checks error. In the context of recalculation, replay unit 301 completes a similar task. It reads all outputs of programs 302, 303 (which the programs output in respective sequences of output data elements 305, 306 according to their respective time frames), compares the time stamps and, if it has detected no violation of a monotonically increasing shared time frame by the time stamps, it places all outputs onto a shared time frame, where it also inserts input data 304, which it also receives in a sequence of input data elements 308 according to an input time frame, and makes the data available to the entire system (i.e., in each case to the program for which the respective data are intended). The result is a sequence 307 according to the global time frame, which includes output data elements, input data elements and control signals (for activating and deactivating programs (302, 303).

However, the function of the replay unit extends beyond software lockstep insofar as the replay unit, when combining the outputs of programs 302, 303 and input data 304, takes a sequence of test events 311 into account, which are provided by an event simulator 309.

An interface to the event simulation by event simulator 309 may be provided to one or to multiple further components 310, so that the latter are able to trigger test events and are able to delay the visibility of data for programs 302, 303, so that these data are not immediately visible to programs 107, but only when it is allowed by event simulator 309.

Event simulator 309 may include, in particular, an activation event simulator, which provides control signals for activating and deactivating programs 302, 303. The event simulator also provides data transmitting events (i.e., data visibility events), via which the visibility of output data or input data (previously ascertained by one of the programs), is triggered for the programs.

The further component (for example, a test control process) 310 is thus able to control the event simulation. This enables a test design with fine granularity for recalculations. This enables (on the same execution environment) reproducible recalculations for the correction of errors, the automatic generation of test scenarios (search based testing) and their external configuration, and a stochastic analysis of the robustness, in particular, of software for autonomous driving. Further component 310 may also provide input data 304.

Figure 4:
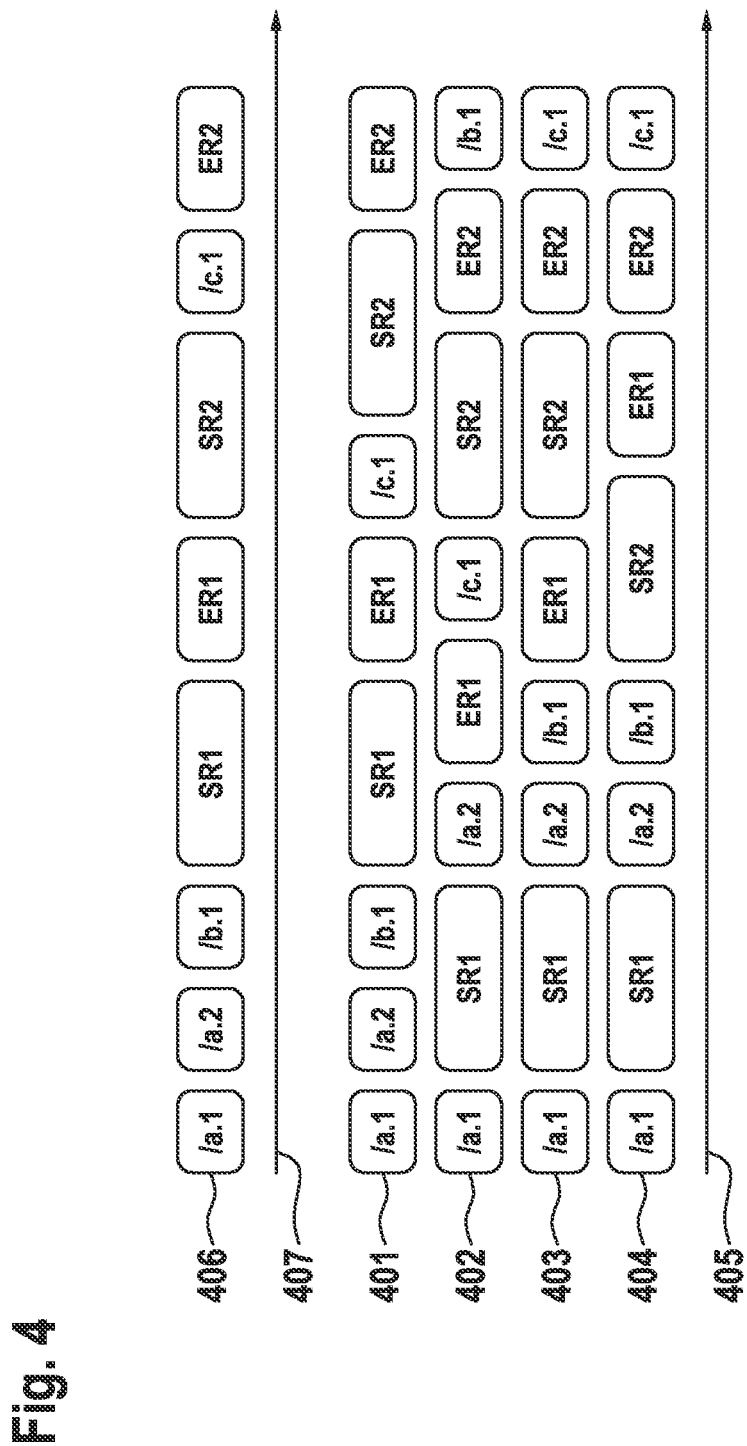
FIG. 4 shows examples of test scenarios 401 through 404, which may be used for tests, according to an example embodiment of the present invention.

FIG. 4 shows examples of test scenarios 401 through 404, which may be used for tests by using a global simulation time 405 for example, (implemented using the architecture of FIG. 3) as compared to an exemplary event chain 406 of a recalculation without a global simulation time (i.e., according to an execution time frame 407, as it occurs during the execution in real time). The test scenarios are represented in the form of the sequence of respective test events 311, which are output for implementation by event simulator 309.

In first test scenario 401, the start of the data processing is shifted backward by second program (SR2), so that it receives data (for example, message) /c.1.

In second test scenario 402 and third test scenario 403, the transmittance of input data /a.2 or /a.2 and /b.1 is shifted backward. Thus, in each case the context of the programs is changed compared to the above-described scenarios (i.e., represented further above in FIG. 4).

In fourth test scenario 404, the ending of the data processing by first program (ER1) is shifted to after the start of the execution by second program (SR2). Thus, in this test scenario, it is ensured that the context of the second program is not influenced by the previous execution (i.e., by its output) of the first program.

Figure 5:
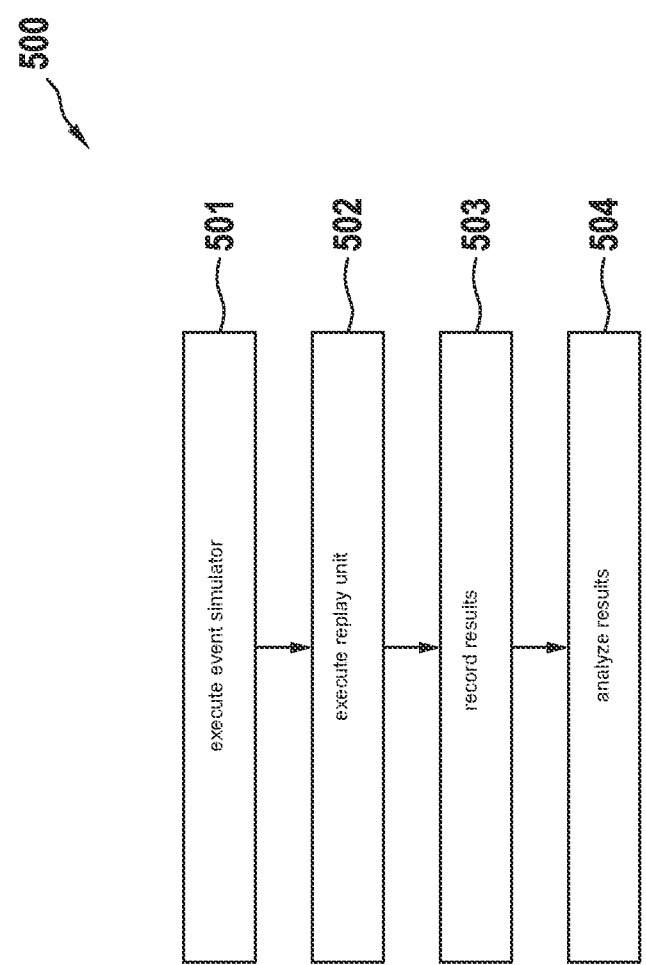
FIG. 5 shows a flowchart 500, which represents a method for testing a data processing distributed to multiple programs according to one specific embodiment of the present invention.

In summary, according to various specific embodiments, a method is provided as represented in FIG. 5.

FIG. 5 shows a flowchart 500, which represents a method for testing a data processing distributed to multiple programs according to one specific embodiment.

In 501, an event simulator is executed which, according to one predefined test scenario for testing multiple programs, generates test events for each program, which include at least a start-test event, which indicates that the program is to start a data processing;

an ending-test event, which indicates that the program is to end the data processing;

an output-data-visibility event, which indicates that the output data of the program are visible to one or to multiple of the other programs; and an input-data-visibility event, which indicates that the test-input data for the program are to be fed to the program.

In 502, a replay unit (i.e., a replay (control) program or also test control program) is executed, which is connected to the event simulator and which for each program, starts the data processing by the program during the start-test event for the program;

receives output data generated by the program and forwards it during the output-data-visibility event for the program to the one or to the multiple of the other programs; and ends the data processing by the program during the ending-test event for the program.

Results of the execution of the programs are recorded in 503.

In 504, the results are analyzed with respect to errors of the data processing.

In other words, according to various specific embodiments, the execution of programs and their data communication among one another (and the receipt of input data) is synchronized to a global time frame, which is provided by a test scenario and is implemented (i.e., forced) with the aid of test events.

The method of FIG. 5 may be carried out by one or by multiple computers which include one or multiple data processing units. The term "data processing unit" may be understood to be any type of entity that enables the processing of data or signals. The data or signals may, for example, be treated according to at least one (i.e., to one or more than one) specific function, which is carried out by the data processing unit. A data processing unit may include or be formed by an analog circuit, a digital circuit, a logic circuit, a microprocessor, a microcontroller, a central unit (CPU) a graphics processing unit (GPU), a digital signal processor (DSP), an integrated circuit of a programmable gate array (FPGA) or any combination thereof. Any other way of implementing the respective functions, which are described in greater detail herein, may also be understood to be a data processing unit or logical circuit arrangement. One or multiple of the method steps described in detail herein may be carried out (for example, implemented) by a data processing unit by one or by multiple specific functions, which are carried out by the data processing unit.

The approach of FIG. 5 may, for example, be used for testing the control software of a robotic device. The term "robotic device" may be understood as relating to any technical system (for example, including a mechanical part, whose movement is controlled) such as, for example, a computer-controlled machine, a vehicle, a domestic appliance, a power tool, a manufacturing machine, a personal assistant or an access control system.

Although specific embodiments have been represented and described herein, those skilled in the art will recognize that the specific embodiments shown and described may be replaced by a variety of alternative and/or equivalent implementations without departing from the scope of protection of the present invention. This application is intended to cover any adaptations or variations of the specific embodiments discussed herein.

What is claimed is:

1. A computer-implemented method for testing a data processing distributed to multiple programs, wherein the multiple programs are executable by one or more processors, independently of one another in a real-world scenario, the method comprising:
    executing, by a testing processor, an event simulator to generate a test scenario that simulates a subjection of the multiple programs to the real-world scenario, wherein the test scenario includes respective test events for each program of the multiple programs, the test events including at least:
        a start-test event, which indicates that the respective program is to start the data processing,
        an ending-test event, which indicates that the respective program is to end the data processing,
        an output-data-visibility event, which indicates that output data of the respective program are visible to one or to multiple of other ones of the multiple programs, and
        an input-data-visibility event, which indicates that test input data for the respective program are to be fed to the respective program;
    executing, by the testing processor, a replay unit, which, based on the test scenario generated by the event simulator, runs the multiple programs on the testing processor thereby simulating the real-world scenario with new data handling interdependencies between the multiple programs restricting the running of respective ones of the multiple programs based on the running of other ones of the multiple programs, the new data handling interdependencies (I) not being present when the multiple programs are executed in the real-world scenario and (II) being implemented by using the start-test events, the ending-test events, the output-data-visibility events, and the input-data visibility events, wherein the running of the multiple programs is implemented by performing as follows for each program of the multiple programs by:
        starting the data processing by the respective program upon reaching the start-test event of the generated test scenario that has been generated for the respective program;
        making available the test input data for the respective program upon reaching the input-data-visibility event for the respective program;
        receiving output data generated by the respective program and forwards the received output data generated by the respective program, upon reaching the output-data-visibility event generated for the respective program, to the one or to the multiple of the other ones of the multiple programs; and
        ending the data processing by the respective program upon reaching the ending-test event for the respective program;
    recording, by the testing processor, results of the running of the multiple programs; and
    analyzing, by the testing processor, the results with respect to errors of the data processing.

2. The method as recited in claim 1, wherein the event simulator ascertains an order of the test events generated for the multiple programs to implement the test scenario and outputs the test events to the replay unit according to the ascertained order.

3. The method as recited in claim 1, wherein the data processing is a control of a robotic device of which the one or more processor are a part and each program of the multiple programs is a program for a respective one of the one or more processors of the robotic device.

4. The method as recited in claim 3, wherein the testing processor executing the event simulator and/or the replay unit is external to the robotic device.

5. A method for testing a data processing distributed to multiple programs, the method comprising:
    executing an event simulator, which according to a test scenario for testing multiple programs, generates test events for each program of the multiple programs, the test events including at least:
        a start-test event, which indicates that the respective program is to start the data processing, an ending-test event, which indicates that the respective program is to end the data processing, an output-data-visibility event, which indicates that output data of the respective program are visible to one or to multiple other ones of the multiple programs, and an input-data-visibility event, which indicates that test input data for the respective program are to be fed to the respective program;

executing a replay unit, which is connected to the event simulator, and which, for each program of the multiple programs:

starts the data processing by the respective program during the start-test event for the respective program, makes the test input data for the respective program available to the respective program during the input-data-visibility event for the respective program, receives output data generated by the respective program and forwards the received output data, generated by the respective program, during the output-data-visibility event for the respective program to the one or to the multiple other ones of the multiple programs, and ends the data processing by the respective program during the ending-test event for the respective program;

recording results of execution of the multiple programs; and analyzing the results with respect to errors of the data processing;

wherein for each program of the multiple programs:

the output data of the respective program include at least one output data element with a respective time stamp; and the replay unit ascertains whether, and accordingly carries out an error handling if, the replay unit has already forwarded another output data element that (i) had been generated by one of the multiple programs and (ii) has a higher time stamp than the respective time stamp.

6. A data processing system comprising a testing processor and a memory storing an event simulator and a replay unit that are executable by the testing processor configured to test a data processing distributed to multiple programs, wherein the multiple programs are configured for being executed, by one or more processors, independently of one another in a real-world scenario, the test being implemented by:

executing, by the testing processor, the event simulator to generate a test scenario that simulates a subjection of the multiple programs to the real-world scenario, wherein the test scenario includes respective test events for each program of the multiple programs, the test events including at least:

a start-test event, which indicates that the respective program is to start the data processing, an ending-test event, which indicates that the respective program is to end the data processing, an output-data-visibility event, which indicates that output data of the respective program are visible to one or to multiple of other ones of the multiple programs, and an input-data-visibility event, which indicates that test input data for the respective program are to be fed to the respective program;

executing, by the testing processor, the replay unit, which, based on the test scenario generated by the event simulator, runs the multiple programs on the testing processor thereby simulating the real-world scenario with new data handling interdependencies between the multiple programs restricting the running of respective ones of the multiple programs based on the running of other ones of the multiple programs, the data handling interdependencies (I) not being present when the multiple programs are executed in the real-world scenario and (II) being implemented by using the start-test events, the ending-test events, the output-data-visibility events, and the input-data visibility events, wherein the running of the multiple programs is implemented by performing as follows for each program of the multiple programs by:

starting the data processing by the respective program upon reaching the start-test event of the generated test scenario that has been generated for the respective program;

making available the test input data for the respective program upon reaching the input-data-visibility event for the respective program;

receiving output data generated by the respective program and forwards the received output data generated by the respective program, upon reaching the output-data-visibility event generated for the respective program, to the one or to the multiple of the other ones of the multiple programs; and ending the data processing by the respective program upon reaching the ending-test event for the respective program;

recording, by the testing processor, results of the running of the multiple programs; and analyzing, by the testing processor, the results with respect to errors of the data processing.

7. A non-transitory computer-readable medium on which are stored commands that are executable by a testing processor and that, when executed by the testing processor, cause the testing processor to perform a method for testing a data processing distributed to multiple programs, wherein the multiple programs are configured for being executed, by one or multiple processors, independently of one another in a real-world scenario, the method including:

executing, by the testing processor, an event simulator to generate a test scenario that simulates a subjection of the multiple programs to the real-world scenario, wherein the test scenario includes respective test events for each program of the multiple programs, the test events including at least:

a start-test event, which indicates that the respective program is to start the data processing, an ending-test event, which indicates that the respective program is to end the data processing, an output-data-visibility event, which indicates that output data of the respective program are visible to one or to multiple of other ones of the multiple programs, and an input-data-visibility event, which indicates that test input data for the respective program are to be fed to the respective program;

executing, by the testing processor, a replay unit, which, based on the test scenario generated by the event simulator, runs the multiple programs on the testing processor thereby simulating the real-world scenario with new data handling interdependencies between the multiple programs restricting the running of respective ones of the multiple programs based on the running of other ones of the multiple programs, the new data handling interdependencies (I) not being present when the multiple programs are executed in the real-world scenario and (II) being implemented by using the start-test events, the ending-test events, the output-data-visibility events, and the input-data visibility events, wherein the running of the multiple programs is implemented by performing as follows for each program of the multiple programs by:

starting the data processing by the respective program upon reaching the start-test event of the generated test scenario that has been generated for the respective program;

making available the test input data for the respective program upon reaching the input-data-visibility event for the respective program;

receiving output data generated by the respective program and forwards the received output data generated by the respective program, upon reaching the output-data-visibility event generated for the respective program, to the one or to the multiple of the other ones of the multiple programs; and ending the data processing by the respective program upon reaching the ending-test event for the respective program;

recording, by the testing processor, results of the running of the multiple programs; and analyzing, by the testing processor, the results with respect to errors of the data processing.

* * * * *